United States Patent [19]

Sanabria

[11] 3,898,449

[45] Aug. 5, 1975

[54] ARRANGEMENT AND METHOD FOR USING A MAGNETIC TAPE TO CONTROL HARDWARE TO LOAD, CHECK AND ROUTINE A CORE MEMORY

[75] Inventor: Rafael A. Sanabria, Elmhurst, Ill.

[73] Assignee: GTE Automatic Electric Laboratories Incorporated, Northlake, Ill.

[22] Filed: Sept. 17, 1973

[21] Appl. No.: 398,131

[52] U.S. Cl. .................... 235/153 AC; 235/153 AM

[51] Int. Cl. .............................................. G11c 29/00

[58] Field of Search ............. 235/153 AM, 153 AC; 340/174 ED, 174 TC, 172.5

[56] References Cited

UNITED STATES PATENTS

| | | | |
|---|---|---|---|
| 3,439,343 | 4/1969 | Stahle | 235/153 AM |
| 3,579,199 | 5/1971 | Anderson et al. | 235/153 AM |
| 3,714,403 | 1/1973 | Ammann et al. | 235/153 AC |
| 3,714,571 | 1/1973 | Walker | 235/153 AC |
| 3,751,649 | 8/1973 | Hart, Jr. | 235/153 AC |
| 3,794,818 | 2/1974 | Kennedy | 235/153 AM |

*Primary Examiner*—Charles E. Atkinson

[57] ABSTRACT

The invention provides an arrangement and method for using a magnetic tape (1) to control the hardware or electronic control circuits in order to execute either a write access to core memory or a read access from the core memory; (2) to verify the contents within a core memory which have been written previously into the core memory; and (3) to introduce patterns into a core memory which are used for determining internal failures within the core memory itself or its associated logic.

6 Claims, 4 Drawing Figures

ARRANGEMENT AND METHOD FOR USING A MAGNETIC TAPE TO CONTROL HARDWARE TO LOAD, CHECK AND ROUTINE A CORE MEMORY

This invention relates to a common control communication system. More particularly, it relates to an improved centralized automatic message accounting system. More particularly still, it relates to an arrangement and method for using a magnetic tape to control hardware in such systems to load, check and routine a core memory.

In the hereinafter described centralized automatic message accounting system, a core memory is utilized and it is composed of ferrite cores as the storage elements, and electronic control or logic circuits are used to energize and determine the status of the cores. The core memory is of the random access, destructive readout type, and contains 16,384 words.

The present invention provides an arrangement and method for using a magnetic tape (1) to control the hardware or electronic control circuits in order to execute either a write access to core memory or a read access from the core memory; (2) to verify the contents within a core memory which have been written previously into the core memory; and (3) to introduce patterns into a core memory which are used for determining internal failures within the core memory itself or its associated logic. While the invention is particularly applicable for use in the described centralized automatic message accounting system, it will be apparent from the description below that the arrangement and method can be used in other similar systems and with other core memories for a like purpose.

Accordingly, it is an object of the present invention to provide an arrangement and method for using a magnetic tape to control hardware to load, check and routine a core memory.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
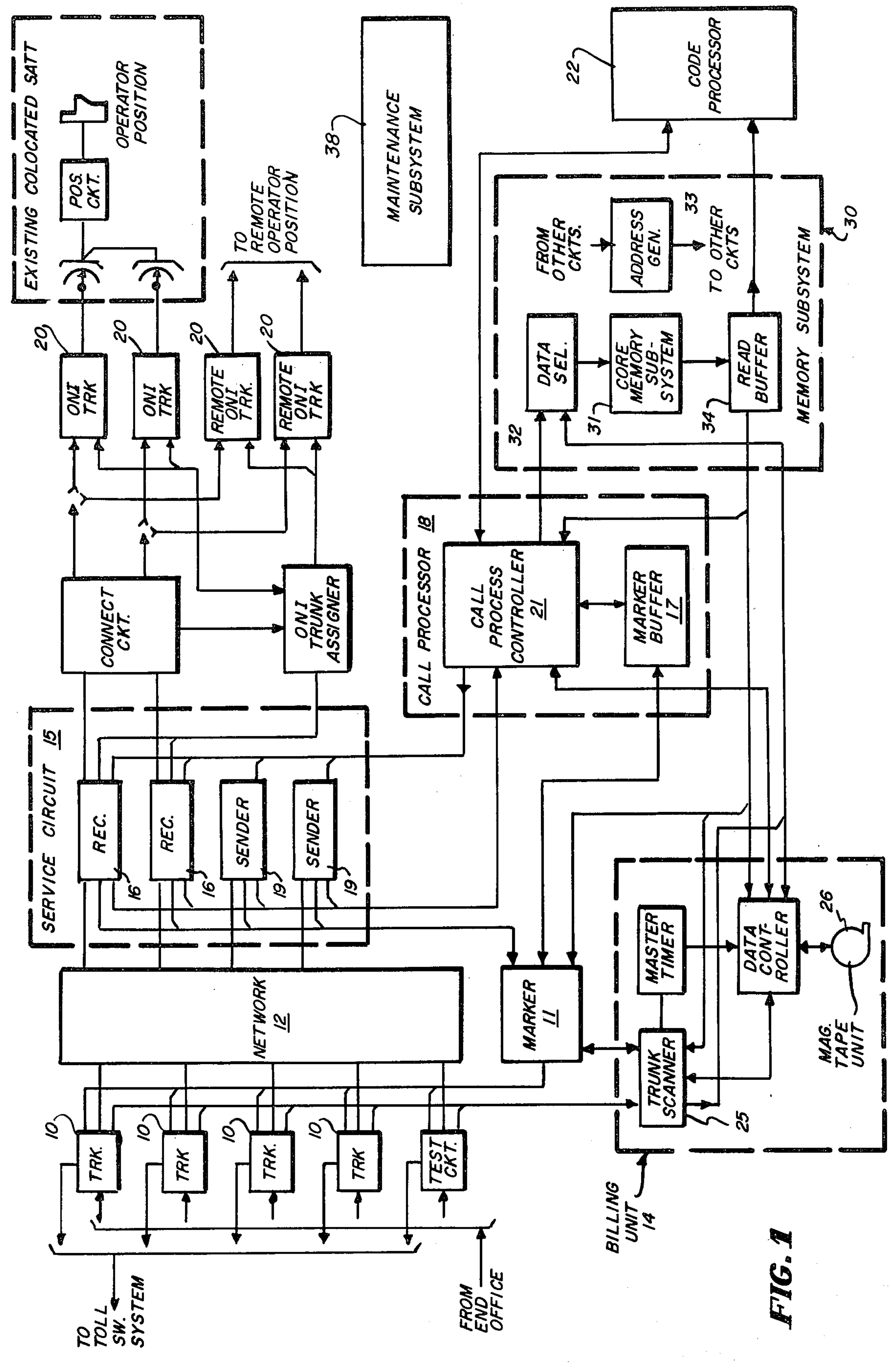
FIG. 1 is a block diagram schematic of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multientry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1%.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via tape transport operating in a continuous recording mode. After the calling and called direction numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the nine channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST", the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives ST, it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and ST. The call process controller 21 will control the duration of tones and interdigital pause. After sending of ST, the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which comprises a status section and a test section.

The status section contains 1 word per ticketed trunk. Each word contains status, instruction, timing and sequence information. The status section also provides 1 word per trunk group which contains the equipment group number, and an equipment position tens word that identifies the frame. A fully equipped status section requires 2761 words of memory representing 2000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, two driver test words, one end-test word and one word for each equipment group. The start test word causes a scan point test to begin. The delay words allow time for scan point filters to charge before the trunk groups are scanned, with the delay words containing only instructional data. The equipment group words contain a two digit equipment group identity and five trunk frame equipped bits. The trunk frame equipped bits (one per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

As indicated above, scanning is performed sequentially. If all trunks in all groups are scanned in numerical sequence beginning with truck 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all ten card positions in all 5 columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in one lineup and one card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to indicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the trunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the GT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for eight scanner cycles (approximately 1 second), answer is confirmed and an entry will be stored in the trunk scanner formater (TSF). If answer is aborted (possibly hookswitch fumble) before the 1 second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CT=1, CM=1, GT=0 and FDS=1, TT will advance 1 count during each scanner cycle, if one-half second has elapsed since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

Figure 3:
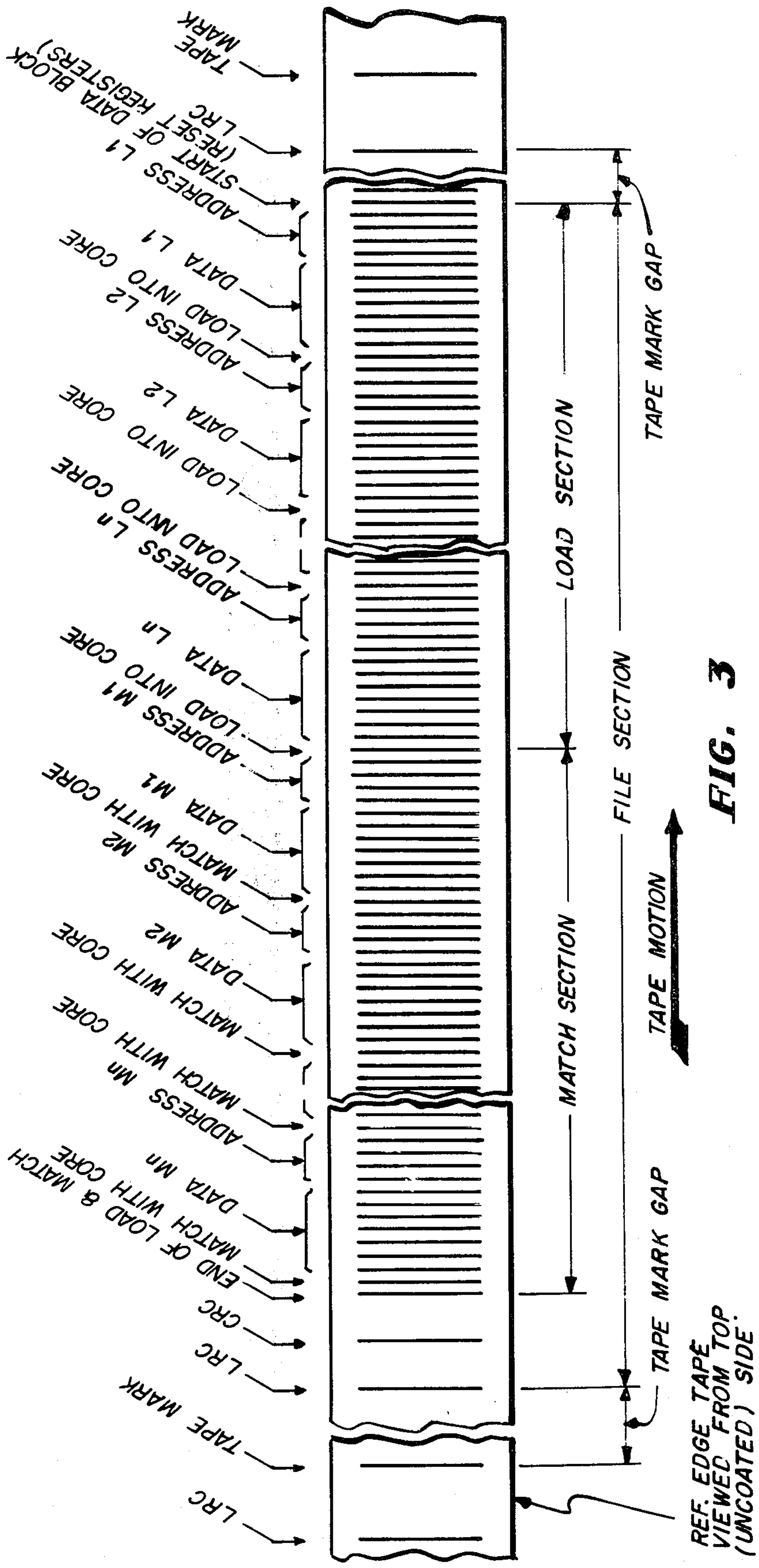
FIG. 3 is a plan view of the magnetic tape.

As indicated above, the present invention is primarily concerned with providing an arrangement and method for using a magnetic tape to load, check and routine the core memory 31. The magnetic tape MT which is generally illustrated in FIG. 3 controls the hardware or electronic control circuits associated with the core memory and executes a read or write access to the core memory, in order for a memory load function in case of a core memory write access, and a core memory read access in order to verify the contents of the word which had been written previously into it.

Figure 2:
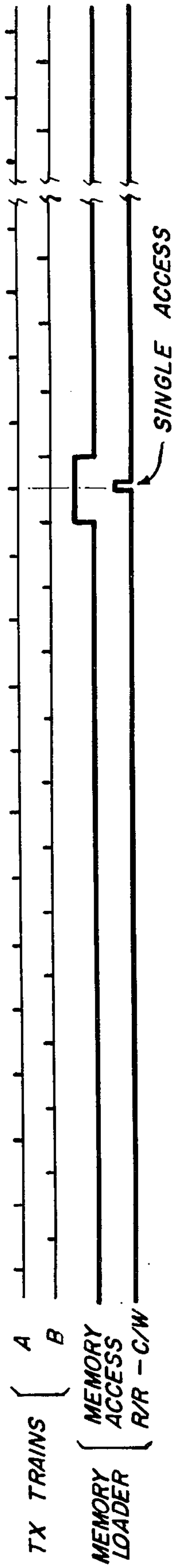
FIG. 2 is a portion of the memory logic access assignment chart.

The hardware control is exercized by assigning a specific character within the magnetic tape MT to be used or decoded in such a fashion that the decode will represent to the hardware the command to either execute a write access to core or a read access from core (see FIG. 3 and Table 1 below), in the manner described more fully below. A single time slot or TX is assigned or dedicated for this access to the core memory, as can be seen in FIG. 2 which illustrates a portion of the memory logic subsystem access assignments.

In other words, the same access is used for one of the two modes: either a read mode or a write mode, and always under the control of the magnetic tape unit or the magnetic tape contents. It should be noted that all of the functions herein described also apply to a TTY or Teletype access to the core memory, for which there is the same type of control characters, the same type of a read or write access, and the same type of function.

TABLE I

| MAGNETIC TAPE CHARACTERS | | | | | | | | | NO. 1 AE-CAMA CHARACTER DESIGNATION | CHARACTER FUNCTION |
|---|---|---|---|---|---|---|---|---|---|---|
| 0 | 1 | 2 | 3 | 4 | 5 | 6 | 7 | P | | |
| 1 | 1 | 1 | 0 | 0 | 0 | 0 | 0 | 0 | 0 | DATA |
| 1 | 1 | 1 | 0 | 0 | 0 | 0 | 1 | 1 | 1 | DATA |
| 1 | 1 | 1 | 0 | 0 | 0 | 1 | 0 | 1 | 2 | DATA |
| 1 | 1 | 1 | 0 | 0 | 0 | 1 | 1 | 0 | 3 | DATA |
| 1 | 1 | 1 | 0 | 0 | 1 | 0 | 0 | 1 | 4 | DATA |
| 1 | 1 | 1 | 0 | 0 | 1 | 0 | 1 | 0 | 5 | DATA |
| 1 | 1 | 1 | 0 | 0 | 1 | 1 | 0 | 0 | 6 | DATA |
| 1 | 1 | 1 | 0 | 0 | 1 | 1 | 1 | 1 | 7 | DATA |
| 1 | 1 | 1 | 0 | 1 | 0 | 0 | 0 | 1 | 8 | DATA |
| 1 | 1 | 1 | 0 | 1 | 0 | 0 | 1 | 0 | 9 | DATA |
| 1 | 1 | 1 | 0 | 1 | 0 | 1 | 0 | 0 | A | DATA |
| 1 | 1 | 1 | 0 | 1 | 0 | 1 | 1 | 1 | B | DATA |
| 1 | 1 | 1 | 0 | 1 | 1 | 0 | 0 | 0 | C | DATA |
| 1 | 1 | 1 | 0 | 1 | 1 | 0 | 1 | 1 | D | DATA |
| 1 | 1 | 1 | 0 | 1 | 1 | 1 | 0 | 1 | E | DATA |
| 1 | 1 | 1 | 0 | 1 | 1 | 1 | 1 | 0 | F | DATA |
| 1 | 1 | 1 | 1 | 0 | 0 | 0 | 0 | 1 | | NOT ASSIGNED |
| 1 | 1 | 1 | 1 | 0 | 0 | 0 | 1 | 0 | R | RESET |
| 1 | 1 | 1 | 1 | 0 | 0 | 1 | 0 | 0 | L | WRITE OR LOAD |
| 1 | 1 | 1 | 1 | 0 | 0 | 1 | 1 | 1 | M | READ & MATCH |
| 1 | 1 | 1 | 1 | 0 | 1 | 0 | 0 | 0 | | END OF LOAD & MATCH |
| 1 | 1 | 1 | 1 | 0 | 1 | 0 | 1 | 1 | | NOT ASSIGNED |
| 1 | 1 | 1 | 1 | 0 | 1 | 1 | 0 | 1 | | NOT ASSIGNED |
| 1 | 1 | 1 | 1 | 0 | 1 | 1 | 1 | 0 | | NOT ASSIGNED |
| 1 | 1 | 1 | 1 | 1 | 0 | 0 | 0 | 0 | | NOT ASSIGNED |
| 1 | 1 | 1 | 1 | 1 | 0 | 0 | 1 | 1 | | NOT ASSIGNED |
| 1 | 1 | 1 | 1 | 1 | 0 | 1 | 0 | 1 | | NOT ASSIGNED |
| 1 | 1 | 1 | 1 | 1 | 0 | 1 | 1 | 0 | | NOT ASSIGNED |
| 1 | 1 | 1 | 1 | 1 | 1 | 0 | 0 | 1 | | NOT ASSIGNED |
| 1 | 1 | 1 | 1 | 1 | 1 | 0 | 1 | 0 | | NOT ASSIGNED |
| 1 | 1 | 1 | 1 | 1 | 1 | 1 | 0 | 0 | | NOT ASSIGNED |
| 1 | 1 | 1 | 1 | 1 | 1 | 1 | 1 | 1 | | NOT ASSIGNED |
| 0 | 0 | 0 | 1 | 0 | 0 | 1 | 1 | 0 | | TAPE MARK |
| 0 | 0 | 0 | 0 | 0 | 0 | 0 | 0 | 1 | | NULL |

TABLE II

| MAGNETIC TAPE TRACKS | | | | | | | | | |
|---|---|---|---|---|---|---|---|---|---|
| 0 | 1 | 2 | 3 | 4 | 5 | 6 | 7 | P | CHARACTER FUNCTION |
| 1 | 1 | 1 | 1 | 0 | 0 | 0 | 1 | 0 | RESET REGISTERS |
| 1 | 1 | 1 | 0 | A13 | A12 | A11 | A10 | P | |
| 1 | 1 | 1 | 0 | A9 | A8 | A7 | A6 | P | 14 Address Bits |
| 1 | 1 | 1 | 0 | A5 | A4 | A3 | A2 | P | (Address Block) |
| 1 | 1 | 1 | 0 | A1 | A0 | 0 | 0 | P | |
| 1 | 1 | 1 | 0 | DP | D25 | D24 | D23 | P | 25 Data Bits |
| 1 | 1 | 1 | 0 | D22 | D21 | D20 | D19 | P | and |
| 1 | 1 | 1 | 0 | D18 | D17 | D16 | D15 | P | Data Parity |
| 1 | 1 | 1 | 0 | D14 | D13 | D12 | D11 | P | (Data Block) |
| 1 | 1 | 1 | 0 | D10 | D9 | D8 | D7 | P | |
| 1 | 1 | 1 | 0 | D6 | D5 | D4 | D3 | P | |
| 1 | 1 | 1 | 0 | D2 | D1 | 0 | 0 | P | |
| 1 | 1 | 1 | 1 | 0 | 0 | 1 | 0 | O | Load Preceding Data |
| 1 | 1 | 1 | 0 | A13 | A12 | A11 | A10 | P | (write) into Core |
| 1 | 1 | 1 | 0 | A9 | A8 | A7 | A6 | P | |
| 1 | 1 | 1 | 0 | D10 | D9 | D8 | D7 | P | |
| 1 | 1 | 1 | 0 | D6 | D5 | D4 | D3 | P | |
| 1 | 1 | 1 | 0 | D2 | D1 | 0 | 0 | P | |
| 1 | 1 | 1 | 1 | 0 | 0 | 1 | 1 | 1 | Read & Match Preceding |
| 1 | 1 | 1 | 1 | 0 | 1 | 0 | 0 | 0 | Data With Core |
| | | | | | | | | | End of Load & Match |

The memory load process is accomplished by providing within the magnetic tape MT enough characters to formulate a complete set of address and data blocks. As can be seen in Table 2 and FIG. 3, each address and data block is followed by a control character which will be identified and which will determine whether such data and address is to be used in the access to the core memory for: (a) writing such data in the given address if the control character is a core memory write access type of character; or (b) to execute a read and compare type of an access to core memory if the control character is a read access to core memory type of a character.

The write access to core memory character allows the preceding set of address and data to be taken to core in order to execute the write or load process. If a comparison of a previously written word into core is desired, in other words, in order to verify the contents of a particular location in the core memory, it is necessary to supply within the magnetic tape MT itself the address of the core location in question and the data that should be already stored in that address within the core memory, followed by control character which will direct the logic to execute a read access from core and at the same time direct the hardware to compare the given data with the data just read from core. Similar write and then read and compare type of processes are used in other systems, however, in these other systems, this process normally is executed a word at a time. In other words, a particular word is written into core and then immediately that same word is read from core and compared with a second block of data supplied to the logic. The two accesses (Read and Write) are completely independent or different, with one access dedicated for a read access to core and one access or TX, in essence a time slot, dedicated or assigned for the write function. The logic determines, from the information received, which one of the two accesses is to be executed, either a read or a write access. In the present system, only one time slot or TX is used for either the write or the read access to core memory. Also, the comparison mode is executed not on a word-by-word basis, but it is executed at the end of the complete load process, that is, all the words which are to be stored in core are loaded or written into the different core memory locations and then a read and compare cycle or access is executed under the control of the magnetic tape unit. The advantage of executing a complete load or write access followed by a word-by-word comparison access is that if a particular section of the address generator is not operating properly, the location in which the information was written using these other system approaches would be the same address from which the comparison data is read. When the next word is written, it might be written in the same location as the previous word was but there is no indication of this fact since immediately there is executed a read and compare out of the same "wrong" location or address.

However, with the present system, the access for the write mode is executed up to completion. In other words, if the same address is always used for storing the new word or data supplied by the magnetic tape MT, and assuming that there are no equal or similar patterns written in all words, the last word written into core will be different or could be different from any of the other words written previously. Therefore, as soon as a read and compare access is executed, there is bound to be found a particular word whose contents are not the contents that were intended to be written into it. This approach guarantees that the address generator is working properly if at the end of the compare access no errors were detected.

Since the contents of each word written is compared with the data supplied by the magnetic tape unit, the previously described approach for writing and then reading and comparing can be used to store patterns into the core memory, and then reading such patterns and comparing them with patterns newly supplied by the magnetic tape unit which can simulate, by this magnetic tape input, a core memory exerciser which also supplies patterns, specifically all zeros pattern, the all ones pattern, the checker-board pattern, the double checker-board, worst case pattern, address pattern, address complement pattern, etc. The prescribed pattern will be written into a group of words in the core memory and then that group will be read out, a word at a time, and its contents compared with the contents of the magnetic tape. Any fault or hardware error found within this testing approach is flagged out and printed in a teletype printer or similar input/output device.

The teletype access to the core memory can be used in the same fashion as the magnetic tape input, with the added flexibility that any kind of pattern or a combination of data bits can be written into a word or group of words and then immediately compared or checked by the logic supplying the status or state of the hardware involved in such an access.

However, since the access from the teletype is controlled by a maintenance man or some individual, human mistakes can be introduced into the input/output part of a core memory verification or the core memory load device. In order to prevent this kind of human mistakes, since the logic has to accumulate a set of characters representing address and data followed by a character which will direct the logic to execute either a read and compare or a write access to the core memory, the user might make the mistake of assigning more than the full set of characters required for such an access to core or even less of the required characters. If he is executing a write cycle, and if the number of characters supplied by the maintenance man are not the prescribed number of characters to accumulate both the address and the data and the control character needed to execute the proper access into core the logic will detect this improper entry into the system and return an indication to the user to start from the beginning entering the correct number of characters. Again, if more characters than the number required are entered through the teletype keyboard or if less than the required amount of characters are entered, the system will not execute the access requested and will inform the user that such an access is improper.

More specifically, the magnetic tape MT used in the memory loading process is illustrated in FIG. 3, and it can be seen that the first mark or character on it is a control character labeled START OF DATA BLOCK which, as indicated in Table 2, is used to reset all registers. Following this control character appears an address labeled ADDRESS L1 which can be seen to include 14 address bits A13–A0 and two blank bits which form an address block. Immediately following the address block is a data block labeled DATA L1 which, as can be seen in Table 2, includes data bits DP, D25–D1 and two blank bits. These data bits may comprise the memory load code illustrated in Table 1.

Following the data block appears a control character labeled LOAD INTO CORE which, in this case, identifies and determines that the ADDRESS L1 and the DATA L1 is to be used in the access to the core memory to write the data included in the data block into the core memory in the address given by the address block.

In the LOAD SECTION of the magnetic tape MT, any number of similar address blocks and data blocks can be provided on the magnetic tape to load the core memory in any desired fashion.

Following the LOAD SECTION, a MATCH SECTION is provided on the magnetic tape MT, in order to verify the contents of a particular location in the core memory. To do so, it is necessary to supply within the magnetic tape MT the address of the core location in question and the data that should already be stored in that location, followed by a control character which will direct the logic to execute a read access from core and at the same time direct the hardware to compare the given data with the data just read from core. Such addresses and data are indicated in the MATCH SECTION as the ADDRESS M1-Mn and the corresponding DATA M1–Mn, each ADDRESS and DATA being followed by a control character which in this case is a MATCH WITH CORE.

Figure 4:
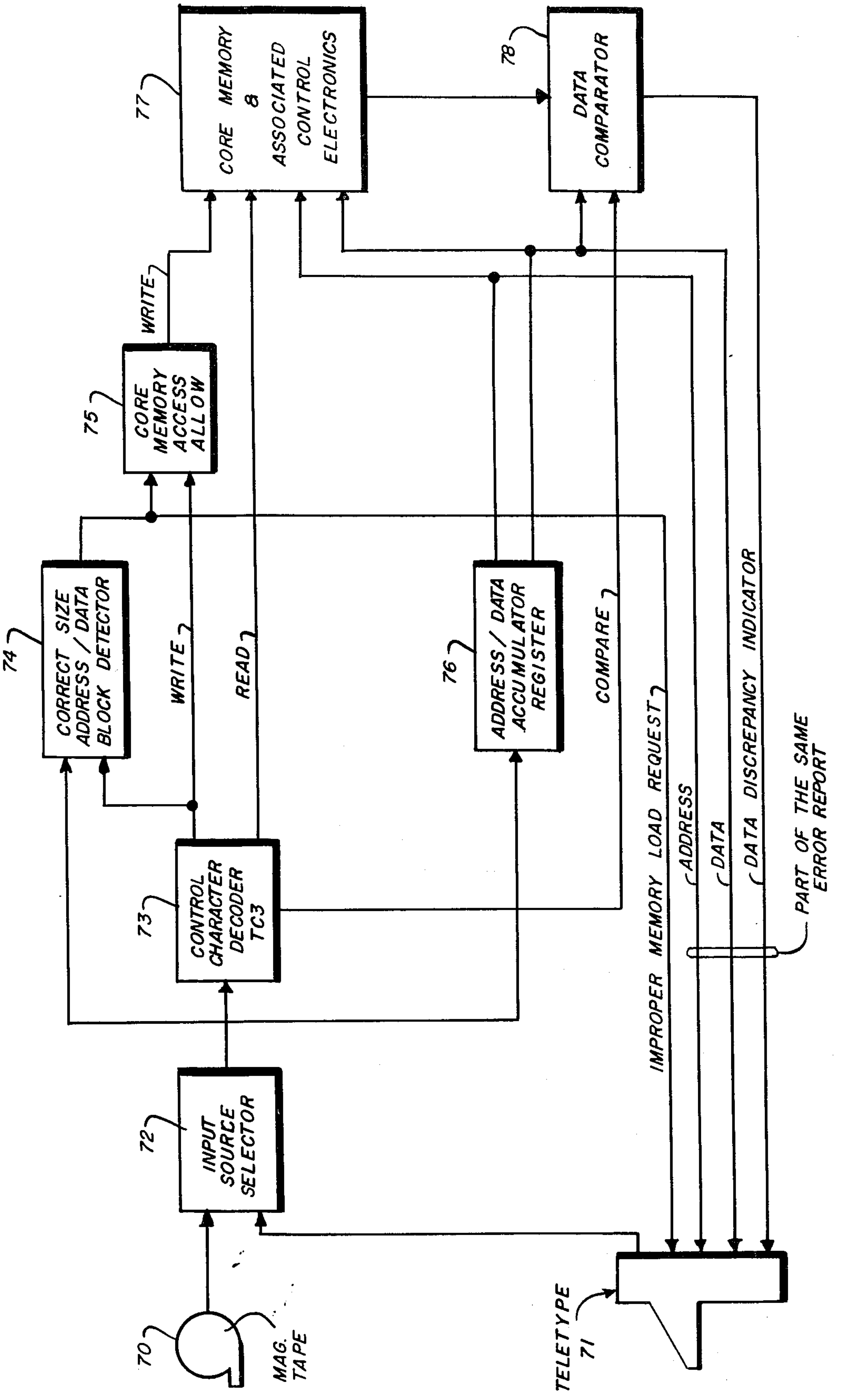
FIG. 4 is a block diagram schematic of logic circuitry for carrying out the load/check/routine function.

In FIG. 4, there is illustrated in a simplified block diagram logic which may be used to execute the above-described features.

An Input Source Selector 72 is provided and is operated to select a data input source which, in the illustrated embodiment, can be Magnetic Tape Unit 70 or the Teletype 71. Either one of them can supply the address, data, and control characters needed to perform the above described Load/Check/Routine function. The selection is performed manually by activating a switch on a Central Control Panel (not shown).

When a character is either read by the Magnetic Tape Unit 70 or inputted to the system via the teletype 71, a Control Character Decoder 73 determines whether the character just received is a control character, meaning a Write Into Core type of a character or a Read from Core and Compare type of character. If the character received is not a control character, it is stored in an Address/Data Accumulator Register 76 for later transfer into the Core Memory Unit 77.

In the illustrated embodiment, as can be seen in Table 2, all the characters imputted via the magnetic tape MT or from the teletype 71 have 5 relevant bits, with their corresponding parity. Out of those 5 bits, 3, 4, 5, 6 and 7 in Table 2, four are used for the data or the decode of the type of control character (bits 4, 5, 6 and 7) and the fifth one (bit 3) is used as a determination as to whether the other four bits form a control character or an address/data character.

After 11 address/data characters have been received, a control character is received and detected by the Control Character Decoder 73 which then generates the Read or Write type of command to the Core Memory Unit 77. If the correct Size Address/Data Block Detector 74 determines that a Write Into Core character has been received after less than 11 address/data characters, or more than 11 address/data characters are received, then an Improper Memory Load Request alarm is generated to the teletype 71. In that case that a Write into Core type of a control character is received, the Core Memory Access Allow 75 gates thru to the Core Memory 77 the Write Into Core type of command if the Correct Size Address/Data Block Detector 74 determines that indeed 11 and only 11 address/data characters have been received prior to this Write Into Core character. Data is then transferred to the Core Memory Unit 77 from the Address/Data Accumulator Register 76, which provides the address in which the corresponding data is to be stored or located.

In the case where a Read From Core and Compare type of control character is received, data is to be read from the address supplied by the Address/Data Accumulator Register 76 and the data just read from that location will be compared with the data stored in the Address/Data Accumulator Register 76. Such comparisons are executed by the Data Comparator 78. Assuming that a discrepancy is detected between the data read from core and the data supplied by the Address-/Data Accumulator Register 76, an indication of a Memory Read and Compare Cycle failure is forwarded to the Teletype 71 for subsequent printing by the Teletype. Such a discrepancy report will contain the address from which the data was read from core, the data which was read from core, and an indication that this kind of a failure report is due to a memory load data discrepancy.

In case of a Teletype Write Into Core access, the address and the data written into core is returned to the Teletype 71 just as a confirmation that the information introduced manually into the system is correct. Otherwise, if the wrong address is inadvertently manually introduced or if there is a hardware failure, the location in which the data was stored cannot be readily determined, since the data discrepancy indicator signal will be blank indicating that no failure was detected. The maintenance man would have to look at the printed page on the Teletype 71 and verify that the returned address is indeed the address in which he had intended to locate or store the information.

The data received from the magnetic tape MT or generated at the teletype 71 will have even parity and if at any time when a data or when any character is received, if the parity associated with that character is not even, then an alarm will be generated and the maintenance man will be so informed.

In review, the Input Source Selector 72 selects the source of data to be used in forming the address/data set of bits or characters needed for access into the core memory. The Control Character Decoder 73 determines if the character just received from either source, previously selected by the Input Source Selector 72 is a control character and which kind of control character it is, that is, is it a write into core character, a read from core type of character, etc. The Address/Data Accumulator Register 76 accumulates all the bits necessary to formulate a complete address and a complete set of data bits including parity to be used either to store the information into core or to compare it with the information previously stored in core. The Correct Size Address/Data Block Detector 74 determines whether the proper number of either tape or Teletype characters have been received prior to receiving a Write Into Core character. If the number received is not the correct number, in the illustrated embodiment, all characters, followed then by the control character, an Improper Memory Load Request alarm is sent to the Teletype 71 for a report to the maintenance man. The Core Memory Access Allow 75 determines, after a write into core character is received, whether that signal should be forwarded to core or not depending on whether the Correct Size Address Data Block Detector 74 determines that an improper number of characters or proper number of characters was received. The Data Comparator 78 is used for comparing the data read from core on a Read From Core access with the data stored in the Address/Data Accumulator Register 76 which was supplied earlier by either the magnetic tape or the teletype keyboard. Of course, the Magnetic Tape Unit 70 serves as the source for reading the magnetic tape and the Teletype 71 is used two fold, one for the inputting of address, data and control characters via the keyboard and the other use is for the report of the miscomparison associated with a Read From Core and Compare type of an access or for a Teletype Memory Load type of access in which case the address, data and the discrepancy indicator will be returned to the Teletype in order for the maintenance man to verify the address given in the report with the address in which he had intended to store the data initially.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method of loading, checking and routining a core memory including a plurality of cores as storage elements and electronic control elements for accessing said cores to write into and to read data stored therein, comprising the steps of:

a. providing on a magnetic tape a plurality of characters to formulate a plurality of sets of address and data blocks, each set of address and data blocks including an address location within said core memory and the data which is stored in or is to be writtein into said address location;

b. providing on said magnetic tape between each said set of address and data blocks a control character which represents to said electronic control elements one of a pair of commands to execute a write access to core and a read access from core, c. writing the data in a data block into the core memory in the address location corresponding to the address block of the same set of address and data blocks when the control character is a command to execute a write access into core, d. reading and comparing the data in a data block of a set of address and data blocks with the data read from an address location corresponding to the address block of the same set of address and data blocks for correspondence when the control character is a command to execute a read access from core.

2. The method of claim 1, further including the step of assigning a single time slot for both the write and read access to the core memory.

3. The method of claim 1, further including the steps of:

a. further providing on said magnetic tape an address and data block set including the address of a core location and the data already stored in that address location;

b. providing a control character immediately following said address and data block set which commands the electronic control circuits to execute a read access from core and to compare the data within said address and data block set with the data read from core;

c. whereby the contents of a particular location in the core memory can be compared and verified.

4. The method of claim 1, further including the steps of:

a. providing a plurality of said address and data block sets on a first portion of said magnetic tape, with each of said address and data block sets being followed by a control character which commands said electronic control elements to execute a write access to core, b. providing on a second portion of said magnetic tape the same plurality of address and data block sets, with each of these address and data block sets being followed by a control character which commands said electronic control elements to execute a read access from core and to compare the data within said address and data block set with the data read from core, c. whereby the data of each of said address and data block sets is written into said core memory and then subsequently read from said core memory and compared to verify that the previously written data in a particular location in the core memory corresponds to the data that was suppose to have been written into that location.

5. The method of claim 4, wherein a single time slot is assigned for both the write and the read access to the core memory.

6. The method of claim 4, wherein the address and data block sets are arranged to store patterns, whereby a core memory exerciser is provided which supplies all zeros patterns, all ones patterns, checker-board patterns, double checker-board patterns, worse case patterns and the like, for detecting and locating internal failures within the core memory or its associated logic.

* * * * *